(12) United States Patent
Hess

(10) Patent No.: US 6,412,515 B1
(45) Date of Patent: Jul. 2, 2002

(54) PRESSURE TRANSDUCER ASSEMBLY WITH HEAT INSULATING ELEMENTS FOR STUB LINE SUPPORT

(76) Inventor: Martin Hess, Kiliansplatz 2, D-80339 Muchen (DE)

( * ) Notice: Subject to any disclaimer, the term of this patent is extended or adjusted under 35 U.S.C. 154(b) by 0 days.

(21) Appl. No.: 09/540,930

(22) Filed: Mar. 31, 2000

(30) Foreign Application Priority Data

Mar. 31, 1999 (DE) ......................................... 199 14 671

(51) Int. Cl.$^7$ .................................................. F16L 5/00
(52) U.S. Cl. ....................... 137/375; 137/343; 137/557; 137/382; 73/756; 73/861.47
(58) Field of Search ............................ 138/50; 137/557, 137/375, 343, 382; 73/30.02

(56) References Cited

U.S. PATENT DOCUMENTS

| | | | | |
|---|---|---|---|---|
| 3,772,538 A | * | 11/1973 | Supitilov .................... | 310/9.1 |
| 4,625,564 A | * | 12/1986 | Murakami et al. ........ | 73/861.24 |
| 4,635,533 A | * | 1/1987 | Whiteside, II .............. | 285/187 |
| 4,738,276 A | * | 4/1988 | Adams ........................ | 137/343 |
| 5,209,258 A | * | 5/1993 | Sharp et al. ................ | 137/343 |

* cited by examiner

Primary Examiner—A. Michael Chambers
(74) Attorney, Agent, or Firm—McNair Law Firm, P.A.; Cort Flint

(57) ABSTRACT

The present invention relates to a pressure transducer assembly (1; 24; 39) on a process circuit (2; 29, 30; 48, 49) as is used in a process plant, whereby the process circuit (2; 29, 30; 48, 49) is capable of carrying a hot fluid. Furthermore at least one fluid carrying measuring line (5; 26, 27; 40, 41) is provided between the process circuit (2; 29, 30; 48, 49) and a valve (4) of the pressure transducer (3; 25; 42), and/or transducer. Furthermore first and second flange connections (6, 10; 31, 32; 44) are provided between connections on the process line 9)2; 29; 30) and the fluid measuring line (5; 26, 27; 40, 41) as well as between the valve (4) and the fluid measuring line (5; 26, 27; 40, 41). These flange connections are connected to each other by means of nuts and bolts (9, 13; 38). According to the invention, a sealing, heat insulating intermediary layer (16, 20; 37; 45) is installed between a flange (7; 33) on the process circuit side and the first flange (8; 34) on the fluid measuring line side and/or between the flange (11; 35) on the valve side and the second flange (12; 36) of the fluid measuring line side. Thanks to this heat insulating intermediary layer (16, 20; 37; 45) the resistance to heat transfer is increased significantly on the flange connections 6, 10; 31, 32; 44), so that the acceptable maximum temperature at the pressure transducer (3; 25; 42) is not reached even with short measuring lines if suitably sized.

9 Claims, 4 Drawing Sheets

PRESSURE TRANSDUCER ASSEMBLY WITH HEAT INSULATING ELEMENTS FOR STUB LINE SUPPORT

BACKGROUND OF THE INVENTION

The present invention relates to a pressure transducer assembly for a process circuit used in a process plant.

In process plants, such as chemical and refining plants, pressure transducers installed on the site are used as field instruments to measure fluid pressure. Pressure transducers are used for example to measure the fluid pressure and to detect the fullness of the fluid. Measuring diaphragms with differential pressure transducers are frequently used to ascertain fluid flow-through.

A generally known pressure transducer assembly for measuring fluid pressure includes at least one fluid measuring line going between the process circuit and the valve of the pressure transducer. It is furthermore known that for simple assembly and possibly disassembly, at least one of the measuring lines is connected by means of flange connections. For this purpose a flange connection between the process circuit and the fluid line is provided. The flange connection consists of a flange on the process circuit side and another appertaining flange on the fluid line side, which are then held together by nuts and bolts. A second flange connection between the valve and the fluid line is also provided. These flange connections consist of a flange on the valve side and a mating flange on the fluid line side. The flange connection is held together by nuts and bolts. The flange on the valve side may also be in the form of a contact plate.

In a known pressure transducer assembly, the pressure transducer is isolated from the process circuit because of high temperatures encountered in the process circuits. This isolation is accomplished by locating the transducer at a sufficient distance from the process circuit by using long fluid measuring lines which carry the fluid. Pressure transducers based on this model are expensive, since the pressure transducer and the valve must be attached separately at a suitable location and the long fluid lines must then be connected. When the process circuit carries a hot fluid, there is usually no overheating problem on the pressure transducer, since cooling takes place over the long measuring lines and an acceptable temperature is not exceeded in the pressure transducer. However, when long measuring lines are used there are risks that the fluid pressure results may be inaccurate thereby defeating the purpose of the transducer assembly. When the fluid lines for measuring the fluid pressure are shortened in order to increase the pressure measurement accuracy, the fluid may not flow continuously thereby causing the pressure transducer to overheat.

To reduce the cost of the pressure transducer assembly it is known to set up the pressure transducer assembly directly on the process circuit, whereby at least one short and stable measuring line can support the valve and the pressure transducer, and no other support is needed.

In such a cost cutting pressure transducer that is used on a process circuit that is carrying a hot fluid, problems can arise. The pressure transducer may overheat as acceptable maximum temperatures for the transducer may be exceeded because of the use of one or more short measuring lines. The hot fluids in the short lines are not cooled, but instead can transfer the heat to the transducer. Due to this overheating problem, process plants must rely on the more expensive known art of using long measuring lines and the separate attachments of the valve and pressure transducer.

Furthermore, a direct pressure transducer assembly on a hot process circuit has already been proposed (WO 97/22855, FIG. 2) in which the pressure transducer with relatively long measuring lines is installed on the process circuit and is connected to the latter through additional holding means. In spite of the direct installation of this pressure transducer assembly on the process circuit, the installation is still expensive, due to the necessary additional holding means, as the attachment only through the long fluid lines is not sufficiently stable.

It is an object of the present invention to provide a pressure transducer assembly of this type to be used on a process circuit in a process plant that carries a hot fluid in such a manner that the assembly is still simple and no overheating of the pressure transducer occurs. It is a further object of the invention to propose a pre-assembled apparatus suitable to this purpose.

The object of the invention is attained, according to the invention, by providing a thick, heat-insulating intermediate layer installed between a flange on the process circuit side and a flange on the measuring line side and/or between the flange on a valve side and a flange on the measuring line. Two or only one flange connection may be provided in this case, depending on the situation. Since at least one of the measuring lines, is a stub line and as such does not carry the hot fluid continuously, a heat transfer essentially occurs in the fluid's stationary state while in the line between the process circuit and the temperature-sensitive electronic system of the pressure transducer. Thanks to the heat-insulating intermediate layer according to the invention on one or several of the flange connections, the resistance to a heat transfer is increased considerably at those locations so that with proper sizing the acceptable maximum temperature is not reached at the pressure transducer, even when short measuring lines are used for cantilevered support.

The installation of a heat-insulating intermediate layer between associated flanges of the flange connection is simple. This intermediate layer also has no detrimental influence on the supporting function of the short measuring line. The stub line can still support the valve and the pressure transducer, so that no additional holding means are necessary for their attachment.

A plastic gasket with a passage opening for the fluid is especially well suited as an intermediate layer, whereby the plastic is wedged sealingly or possibly with an additional seal ring between the associated flanges. A stop valve may be furthermore provided advantageously in the usual manner in the measuring line. The heating of a pressure transducer at a process plant is known and has been intentionally done on occasion to achieve certain effects. The cooling of a pressure transducer to unacceptably low temperatures during the cold season can cause various problems for a plant. Cold weather can bring the possibility of the fluid freezing in the measuring line or can cause the fluid to become viscous and thus yield the wrong measuring results. When a pressure transducer is heated these cold weather effects can thereby be avoided. To achieve this result a heat transfer that starts at the heater and goes along at least one of the measuring lines in the direction of the process circuit is necessary. For a pressure transducer where such heating is necessary due to individual conditions, the invention proposes not to insert heat-insulating intermediate layer in the flange connection close to the heat transmission. The heat-insulating intermediate layer would instead only be placed between the flange on the process circuit side and the associated first flange on the fluid measuring line. With suitable sizing and placement of the heat-insulating intermediate layers several problems can be solved. Overheating of the transducer when the process circuit is carrying hot fluid can thereby be avoided on the one hand, and on the other hand unacceptable cooling of the pressure transducer and of the measuring line can be countered when the process circuit carries cold fluids and/or in case of cold environmental temperatures. In addition, and to increase the resistance to possible overheating, bushings, and in particular flange bushings made of a heat insulating material may be provided in the pass-through openings of the flange through which the flange connecting bolts are inserted, so that the heat transfer via the flange bolts is also reduced. A pressure transducer assembly with a measuring diaphragm for the measurement of fluid flow-through may be used. The above transducer could have two fluid measuring lines, in which the heat-insulating intermediate layers according to the invention can also be used to good effect.

Placing a pressure transducer assembly at least partially within a two-part protective cabinet that can be opened is known. The cabinets have an internal holding device that protrudes into the inside and is attached to at least one cabinet part. It is preferably attached to a hinge element of a hinged model. This internal holding device is connected to at least one of the measuring lines and/or to the valve and/or to the flanges (DE 44 42 944 A1). According to the invention, the internal holding device is designed at least in part as a cooling body with large heat radiation surfaces as a further development of this pressure transducer assembly. Heat release by radiation for the protection of the pressure transducer is thereby achieved advantageously in addition to the increase in heat transfer resistance according to the invention.

A preassembled pressure transducer assembly incorporating the essential characteristics of the pressure transducer assembly described above may also be provided. This preassembled pressure transducer assembly with the heat-insulating intermediate layer or layers can be used on a process circuit in a process plant capable of carrying hot fluids.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Figure 1:
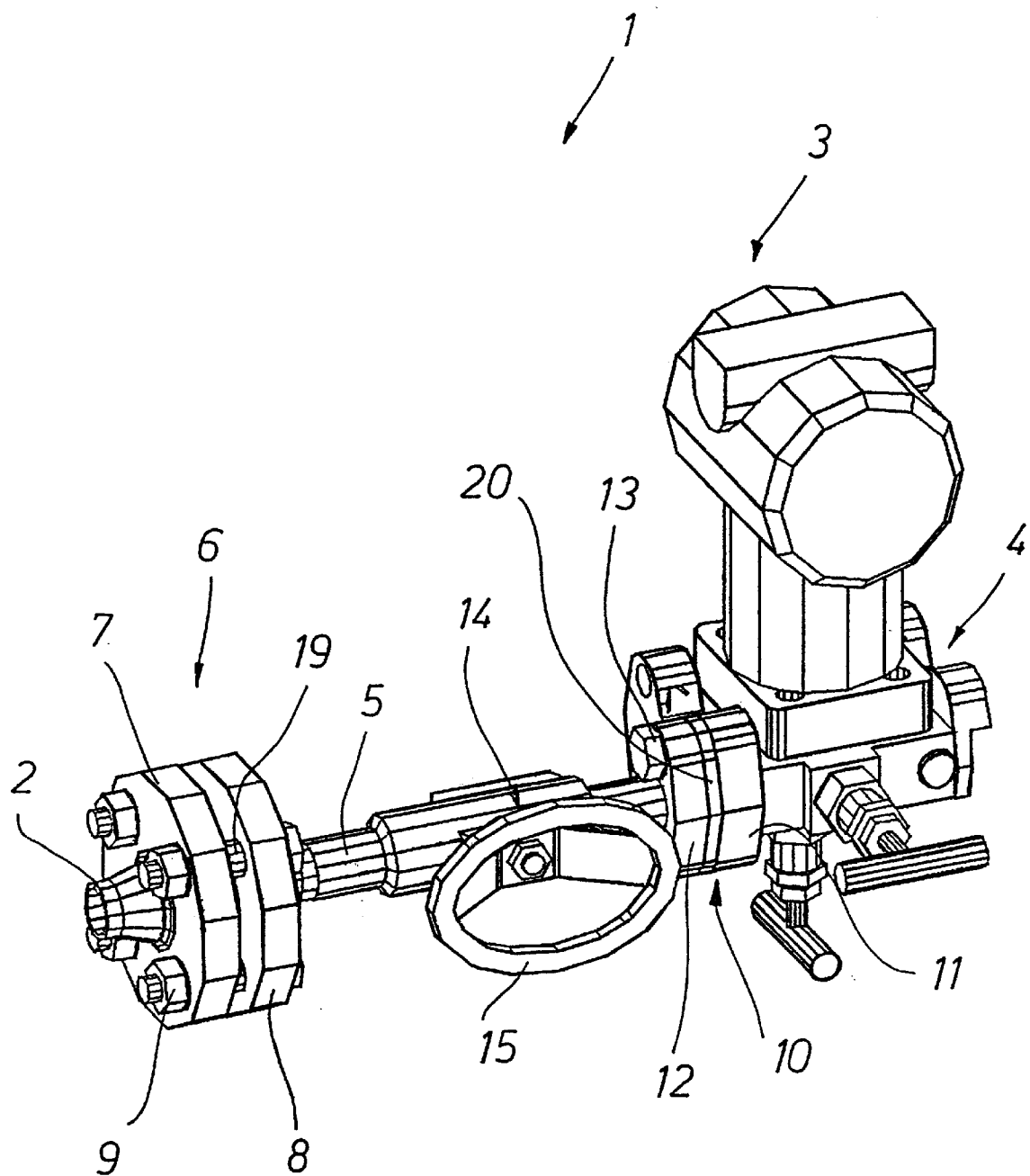
FIG. 1 is a schematic perspective view of a pressure transducer assembly with a measuring line.

FIG. 1 shows a pressure transducer assembly, designated generally as 1, having a process circuit connection 2, shown schematically, for connection to a process circuit in a process plant (not shown), whereby process circuit connection 2 is capable of delivering a hot fluid.

Pressure transducer assembly 1 comprises a pressure transducer 3, a valve 4, as well as a fluid measuring line 5 between the process circuit connection 2 and the valve 4.

The connection between the measuring line 5 and a process circuit connection 2 is effected via a first flange connection 6 that consists of a first flange 7 on the process circuit side and a second flange 8 on the fluid measuring line side. These two flanges 7 and 8 are connected to each other by means of suitable fasteners such as nuts and bolt connections 9.

Furthermore, the fluid measuring line 5 is connected to valve 4 via an additional flange connection 10. This second flange connection 10 consists of a first flange 11 on the valve side and a second flange 12 on the fluid measuring line side which are connected to each other by nuts and bolts 13.

As can be seen also in FIG. 1, the fluid measuring line 5 is short and stable, and a stop valve 14 operated by means of a hand wheel 15 is installed in fluid measuring line 5. With such a design the valve 4, together with the connected pressure transducer 3 is supported in cantilevered position by the fluid measuring line 5 which is connected to the process circuit.

Figure 2:
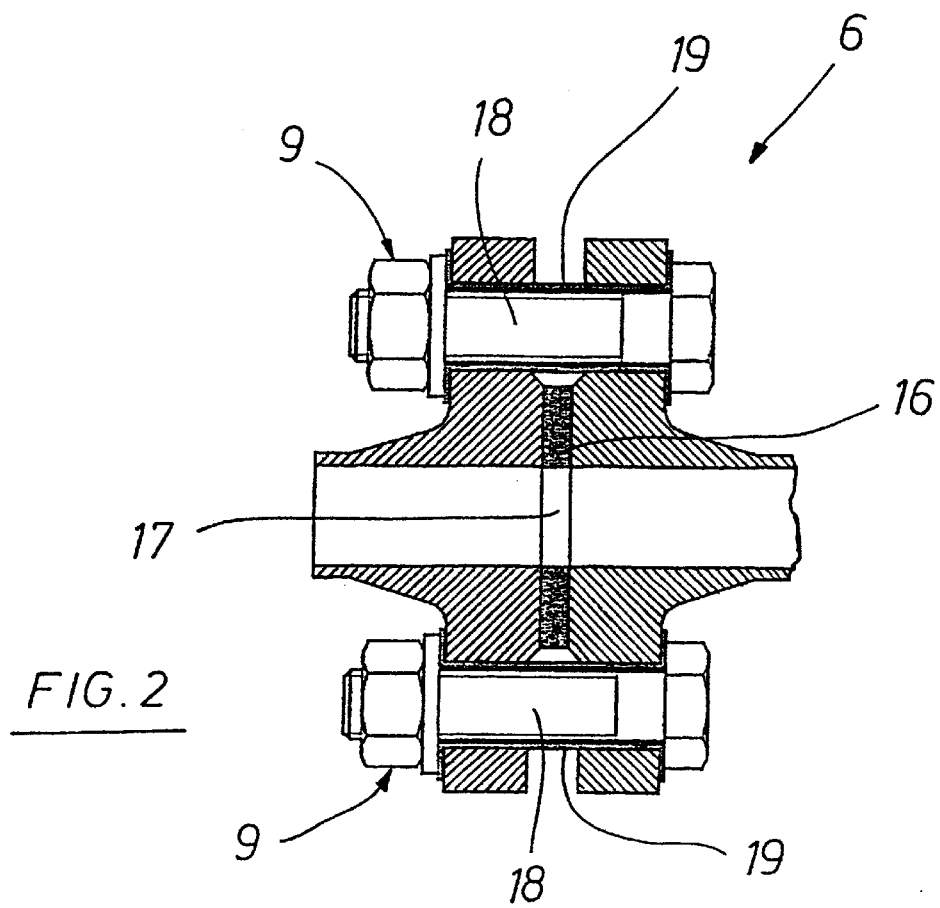
FIG. 2 is a schematic section view of a flange connection between a flange on the process circuit side and a flange on the fluid measuring line side with an interposed sealing, heat insulating intermediate layer.

As can best be seen in FIG. 2, a heat-insulating layer having a fluid passage opening 17 is wedged between flange 7 on the process circuit side and flange 8 on the fluid measuring line side of first flange connection 6. Preferably the insulating layer is provided in the form of a heat-insulating gasket 16. As can be further seen in FIG. 2, flange connection screws 18 of the screw connection 9 of first flange connection 6 are inserted into a passage opening of flange bushings 19 which are also made of a heat insulating material. This establishes a good heat uncoupling, i.e. an increase of the resistance to a heat transfer between flange 7 on the process circuit side and flange 8 on the fluid measuring line side.

In the same manner, a plastic gasket 20 is wedged between flange 11 on the valve side and flange 12 on the fluid measuring line side of flangeconnection 10 as a heat insulating intermediary layer with an opening 21 for the passage of the fluid. Here too, flange connection screws 22 of screw connection 13 are inserted in flange bushings 23 made of a heat insulating material. A good heat uncoupling is provided between second flange 12 on the fluid measuring line side and flange 11 on the valve side.

Figure 3:
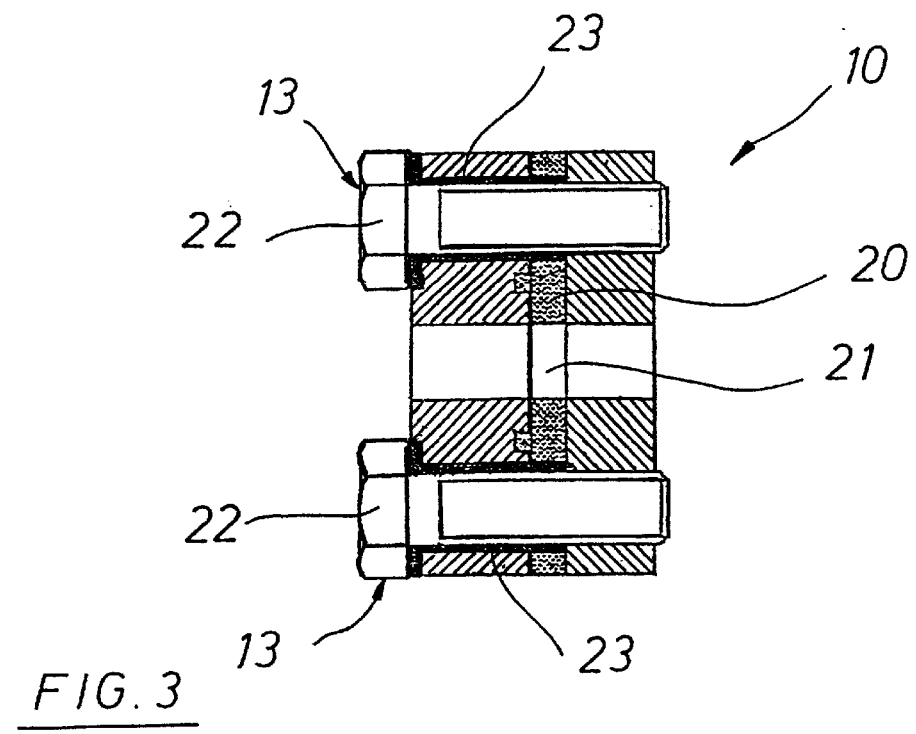
FIG. 3 is a schematic section view of a flange connection between a flange on the fluid measuring line side and a flange on the valve side with interposition of a sealing, heat insulating intermediary layer.
Figure 4:
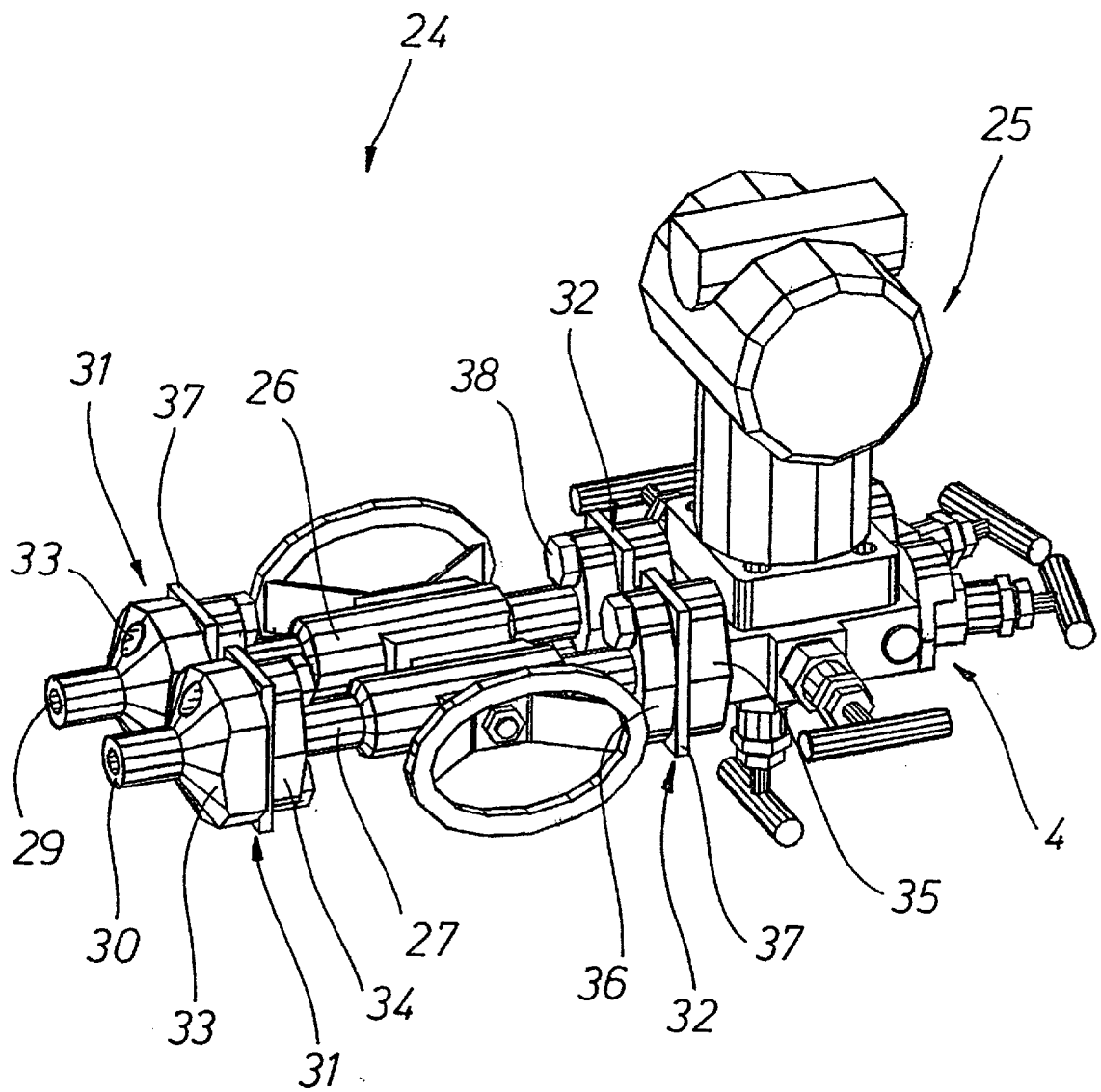
FIG. 4 is a schematic perspective view of a pressure transducer assembly with two fluid measuring lines to form a differential pressure transducer.

FIG. 4 shows an alternative embodiment of a pressure transducer assembly, designated generally as 24, in which a pressure transducer 25 in the role of differential pressure transducer with two measuring lines 26, 27 is connected to process circuit connections 29 and 30 of a measuring diaphragm arrangement of a process circuit which is not shown here. Rectangular plastic gaskets 37 with openings for the passage of the fluid and acting as sealing, heat insulating intermediary layers are wedged between flange 33 on the process circuit side and flange 34 on the fluid measuring line side of a first flange connections 31 as well as between flange 35 on the valve side and flange 36 on the fluid measuring line side of a second flange connection 32. Similarly to the screw connections of FIGS. 2 and 3, screw connections 38 are here also inserted into flange bushings (not shown) made of a heat insulating material.

Figure 5:
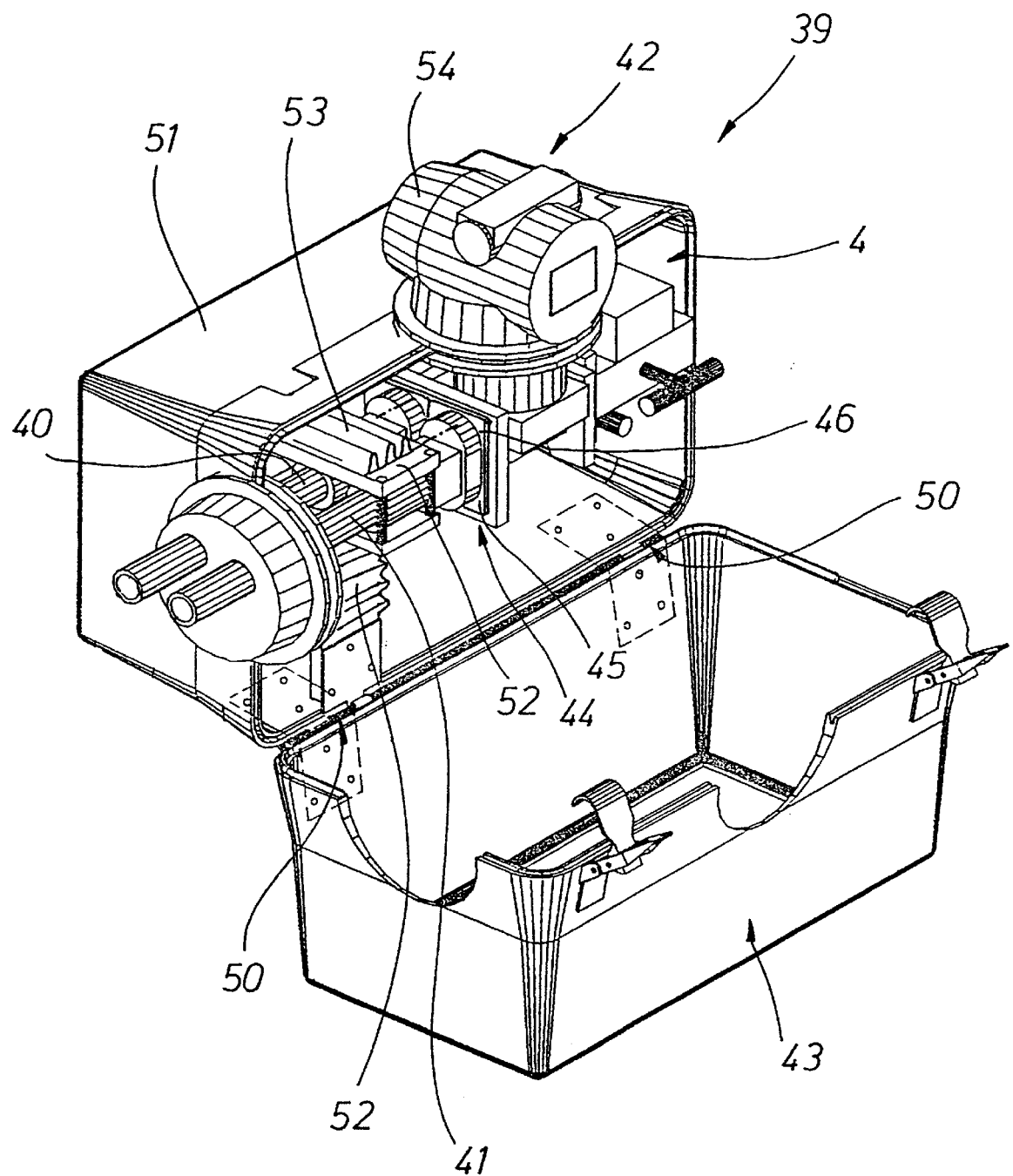
FIG. 5 is a schematic perspective view of a pressure transducer assembly contained in a two-part protective cabinet which can be opened.

Finally in FIG. 5, a pressure transducer assembly, designated generally as 39, is shown which has two measuring lines 49, 41, as the embodiment according to FIG. 4.

Pressure transducer assembly 39 is contained in part in a two-part protective cabinet 43. Measuring lines 40, 41 are short and stable in construction as in the two preceding embodiments, and are connected via flange connections 44, with the interposition of plastic gaskets 45, to a contact plate 46 on the valve side to act as heat-insulating intermediary layer. An internal holding device 52, protruding into the inside of the cabinet, is attached on an upper hinged protective cabinet part 51 and is also connected to the measuring lines 40, 41 in order to hold the protective cabinet 43 on the pressure transducer assembly 39. Cooling ribs 53 acting as heat radiating surfaces are located on the internal holding device 52 and allow for additional heat removal.

As can be seen from FIGS. 1, 4 and 5, each pressure transducer assembly 1, 24, 39 includes an electronic measuring head 54. While the heat-insulating askets or layers have been referred to as plastic, it is to be understood that other suitable heat insulating materials may be used as well.

While a preferred embodiment of the invention has been described using specific terms, such description is for illustrative purposes only, and it is to be understood that changes and variations may be made without departing from the spirit or scope of the following claims.

What is claimed is:

1. A preassembled pressure transducer assembly for utilization with a process circuit of a process plant capable of carrying a hot fluid; at least one fluid measuring line adapted for connected to the process circuit by means of a flange connection; a pressure transducer connected to said fluid measuring line; wherein said fluid measuring line includes a short stub line and serves as a support for the pressure transducer; and a heat-insulating intermediary layer, sealingly wedged between mating flanges of the flange connection which includes a first flange on the process circuit side and a second flange on the measuring line side.

2. A pressure transducer assembly for use with a process circuit in a process plant whereby the process circuit is capable of carrying a hot medium comprising:

a pressure transducer;

a fluid measuring line disposed between the process circuit and said pressure transducer;

a flange connection disposed between a connection to the process circuit and said measuring line which includes a first flange on the process circuit line mating with a second flange on the fluid measuring line side connected to each other by fastening means; and a sealing, heat-insulating intermediary layer disposed between said first and second flanges of said flange connection for thermally insulating at least said second flange so that a length of said fluid measuring line is minimized to provide a short and stable end structure for supporting said pressure transducer in a cantilevered manner.

3. A pressure transducer assembly for connection to a process circuit in a process plant whereby the process circuit is capable of carrying a hot medium; with at least one fluid carrying measuring line disposed between the process circuit and a valve of the pressure transducer assembly; a first flange connection disposed between a connection to the process circuit and the fluid measuring line which includes a first flange on the process circuit line side mating with a second flange on the fluid measuring line side which are connected to each other by means of fasteners; and a second flange connection disposed between the valve and the fluid measuring line which includes a first flange on the valve side mating with a second flange on the fluid measuring line side connected to each other by fastening means; wherein the improvement comprises a first heat-insulating intermediary layer disposed between said first and second flanges of said first flange connection for thermally insulating said pressure transducer assembly from heated fluid carried in the process circuit; and a second heat-insulating intermediary layer disposed between said first and second flanges of said second flange connection for thermally insulating said pressure transducer assembly from heated fluid carried in the process circuit, whereby the length of the fluid measuring line can be minimized to provide a short and stable end structure and the valve with connected pressure transducer is supported in a cantilevered manner by the short measuring line connected to the process line.

4. The assembly of claim 1 wherein said heat-insulating intermediary layer comprises a plastic gasket with an opening for the passage of the fluid, and said that the plastic gasket is wedged sealingly between the mating first and second flanges of said first and second flange connections.

5. The assembly of claim 1 including a stop valve disposed in said fluid measuring line.

6. The assembly of claim 1 including a heater installed in the pressure transducer and said heat insulating intermediary layer is installed only between said flanges of said first flange connection.

7. The assembly of claim 1 wherein said fastening means includes flange connection fasteners inserted into passage openings in flange bushings carried by said first and second flanges of said first and second flange connections; and said flange bushings are made of a heat insulating material.

8. The assembly of claim 1 wherein said pressure transducer comprises a differential pressure transducer connected by means of two fluid measuring lines to a measuring diaphragm of the process circuit.

9. The assembly of claim 1 wherein said pressure transducer assembly is contained at least in part in a hinged, two-part protective housing;

an internal holding device protruding into the inside of said housing, and said holding device being connected to at least one measuring line; and the internal holding device is made at least in part in form of a cooling body with heat radiating surfaces.

\* \* \* \* \*